(12) United States Patent
Bae

(10) Patent No.: US 6,871,813 B2
(45) Date of Patent: Mar. 29, 2005

(54) VEHICULAR SEATBELT RETRACTOR

(75) Inventor: Gi Young Bae, Wonju-shi (KR)

(73) Assignee: Delphi Automotive Systems Sungwoo Corporation, Kangwon-do (KR)

( * ) Notice: Subject to any disclaimer, the term of this patent is extended or adjusted under 35 U.S.C. 154(b) by 179 days.

(21) Appl. No.: 10/328,177

(22) Filed: Dec. 26, 2002

(65) Prior Publication Data

US 2004/0124625 A1 Jul. 1, 2004

(51) Int. Cl.[7] .......................... B60R 22/36; B65H 75/48
(52) U.S. Cl. .............................. 242/379.1; 242/383.4; 242/384.6; 280/807
(58) Field of Search .............................. 280/805, 806, 280/807; 242/379.1, 383.4, 384.6

(56) References Cited

U.S. PATENT DOCUMENTS

| | | | |
|---|---|---|---|
| 3,819,126 A | | 6/1974 | Stoffel |
| 4,422,594 A | * | 12/1983 | Honl ........................ 242/383.4 |
| 4,603,819 A | * | 8/1986 | Loose et al. ................. 242/379 |
| 5,232,177 A | * | 8/1993 | Hibata ...................... 242/382.2 |
| 5,495,994 A | * | 3/1996 | Rumpf et al. ............. 242/384.4 |
| 5,507,448 A | | 4/1996 | Park et al. |
| 6,237,869 B1 | | 5/2001 | Ahn |
| 6,443,382 B1 | | 9/2002 | Bae |
| 6,726,141 B1 | * | 4/2004 | Ichikawa et al. ........ 242/383.4 |
| 6,732,967 B2 | * | 5/2004 | Sumiyashiki ............... 242/376 |

FOREIGN PATENT DOCUMENTS

KR    10-0323845    1/2001

* cited by examiner

*Primary Examiner*—Paul N. Dickson
*Assistant Examiner*—Laura B Rosenberg
(74) *Attorney, Agent, or Firm*—Jacobson Holman PLLC

(57) ABSTRACT

A vehicular seatbelt retractor includes a load control for controlling an excessive force applied to a web and a web sensor for sensing the webbing acceleration of a seatbelt to take counteraction against the abnormal state of a vehicle at a quick speed, in which the load control enables a disk to be frictionally engaged with one surface of a spool winding portion, thereby dissipating the force applied to a web, and a torsion bar coupled at one end with a boss to be cooperated with a spool, thereby controlling the force applied to the web and the web sensor enables a latch member elastically supported at one end by an inertia spring to sense the web acceleration in an adjusted time range along with a wing thereby to take counteraction against the abnormal state of a vehicle.

3 Claims, 8 Drawing Sheets

VEHICULAR SEATBELT RETRACTOR

FIELD OF THE INVENTION

The present invention is related to a seatbelt retractor for controlling the webbing of a seatbelt according to an abnormal driving state (e.g., collision, or roll-over) of a vehicle, and, more particularly, to a vehicular seatbelt retractor comprising a web sensor for quickly sensing webbing acceleration of the seatbelt and a load control portion for controlling excessive force applied to a web, thereby enabling the countermeasure against a vehicle abnormal state.

BACKGROUND OF THE INVENTION

Generally, there has been a well-known technology in this field that a seatbelt retractor is asked to facilitate the webbing upon the wearing of the seatbelt by an occupant or to prevent the drawing-out of the webbing in an emergency or abnormal state of a vehicle. However, what is considered as a problem in this technical field is the timely detection of the abnormal state of the vehicle. To do so, a webbing sensor for detecting the pulling-out acceleration of the webbing and a motion (inertia) sensor for detecting the abnormal state of the vehicle during driving due to any sudden and/or severe disruption in traveling speed, due to the impact of a collision for example, have been developed to supplement their disadvantages to each other. Herein, it is noted that the pulling-out acceleration detection of the webbing, including its responding time, must comply with the counteracted against the abrupt rotation during running and rollover in a slanted street and off-road conditions.

In respect of these points, a typical technology is U.S. Pat. No. 3,819,126 disclosing a seatbelt retractor that comprises a gear wheel actuated locking means and a web sensor configured to control a locking member mounted on the reel means to be pivoted between a locking position for preventing the rotation of the reel in the unwinding direction and a pair of release positions for allowing the reel to be rotated in the unwinding direction.

A clutch plate is mounted between a support and a reel ratchet to be biased by the spring so that a first stop supports the locking member in a pushing direction. A disabling member is rotatably mounted so that its resilient arm is connected to the support to be biased in a winding direction. An arm enlargement is fitted into the opening of the locking member to get the locking member to be supported in an unwinding direction. A wheel includes a resilient arm and a second stop, in which the resilient arm has a finger formed at its one end to be supported in the opening of the support to bias the wheel toward the disabling member. The other end of the wheel has a foot for engaging a shoulder carried by the wheel to position the second stop to abut the locking member in its intermediate release position, and the second stop disables the reel-locking device, when the belt is rapidly released or unwound from the retractor or the vehicle is in the abnormal state.

Therefore, in the abnormal state of the vehicle, as the reel is rotated rapidly in the unwinding direction by the pulling out on the belt, the inertia wheel rotates slightly with respect to the actuator to cam the pawls radially outwardly to mate with the teeth. The locking operation prevents the seatbelt from being released before less than ½ inch thereof. And then, as the coupling of a cam pawl of the actuator with the wheel ratchet is released by the spring of the clutch plate, the first stop permits the locking member to be returned to a normal position, and the second stop of the wheel forces the locking member to become disabled. The seatbelt retractor has advantages in that the webbing sensing speed is quick and the occupant restraint is performed during the traveling of the vehicle off-road.

However, in the seatbelt retractor the web sensor further includes the clutch plate, the disabling member and the wheel, so it results in causing the delay of the web sensing time due to the complex operation steps of parts for withdrawing and releasing the seatbelt. Further, in a web-sensing step the inertia wheel must be rotated at over a predetermined speed in order to expand the cam pawl outward enough to engage with the tooth of the wheel due to a relatively wider gap between them. Otherwise, the slip between them occurs.

Another technology that resolves this advantage and prevents the releasing of the webbing at a rapid speed per international standards is disclosed in Korean Patent No. 323845 corresponding to U.S. Pat. No. 5,507,448 assigned to this Applicant, which is entitled "Vehicular Seatbelt Retractor". A web sensor adapted to this vehicular seatbelt retractor includes a mass member, which is inserted into a first tooth portion body of a clutch wheel, so that its wing latches faces a second sprocket of a retainer ring in a normal state. In other words, the mass member and the clutch wheel are rotated at the same time at any of unwinding and winding directions. But, upon the acceleration of the webbing, the mass member is instantly rotated in the webbing releasing direction, while the clutch wheel is also rotated under its inertia force. The latches pass over the tops of the teeth of the first tooth portion, so its ends are hung on the second sprocket of the retainer ring due to their centrifugal force. At that time, the rotational force of the shaft rotates the retainer. At the same time, the hook ring of the retainer forces the latch of the locking portion to be engaged with the first sprocket so as to stop the further rotation of the spool and prevent the releasing of the webbing. Then, as the releasing force of the webbing pulls the rotating stopped spool in a webbing direction to a frame or opening upper portion, the frictional tooth portions respectively formed on the opening portions become engaged with the flanges to assure the prevention of the further rotation of the spool.

The web sensor has speedy webbing sensing and a reduced number of its parts, which performs the immediate webbing stop in response to the sensing operation and facilitates the expansion of the latches while being put on the tooth top in order to reduce a gap between the latch end and a second sprocket.

But, the web sensor has a limitation in enhancing the sensing speed of the webbing and can't adjust the sensing speed and also the conversion into the normal state for enabling the web releasing, because the conversion is dependent upon the elastic degree. Also, these prior arts fail to take a countermeasure against an instant excessive load due to the reaction against the abrupt advancement of an occupant in an abnormal state of a vehicle, as the spool is stopped in response to the sensing of the webbing acceleration. For it, a web tension reducer similar to a skid mechanism of a safety seatbelt retractor disclosed in U.S. Pat. No. 6,237,869 is required, which is subject to controlling the load and often called "Load Limiter".

In these respects, it is preferable if it is possible to positively take countermeasures against the abnormal or rollover state according to the acceleration that the web sensor senses in the collision a of a vehicle and on an off road. Also, it is preferable to adapt a tension reducer in order to control the excessive load applied to a web.

Accordingly, an object of the invention is to provide a vehicular seatbelt retractor for sensing the webbing acceleration of a seatbelt followed by an abnormal driving state of a vehicle such as collision or roll-over in time and controlling the web operation through at least one procedure in response to the webbing sensing.

Another object of the invention is to provide a vehicular seatbelt retractor for enabling a speed adjustment of a webbing acceleration sensing and providing the flexibility to the webbing control.

Another object of the invention is to provide a vehicular seatbelt retractor for enabling the winding and unwinding of sensing the web acceleration, immediately, responsive to the vehicle abnormal state and controlling the instant excessive load applied to a web of an occupant.

SUMMARY OF THE INVENTION

According to the present invention, a vehicular seatbelt retractor includes a frame having openings formed at the center of each of a pair of left and right leg portions, on an upper portion of each of which a frictional tooth portion is formed in a predetermined arc; a spool for winding a web thereon; a web sensor for sensing the webbing acceleration; a locking portion mounted adjacent said sprocket portion to stop the rotation of said spool; and a vehicle sensor mounted adjacent the clutch wheel to engage with a second tooth portion of the clutch wheel and for winding and releasing a length of webbing from a spool comprises a winding portion sealed at one end and opened at the other end and a sprocket portion, in which the winding portion forming a cavity therein includes a flange formed on the circumferential portion from one side of said spool to be positioned on the opening thickness of said left leg portion with a shaft projected from the center of said sealed end to be coupled with one end of a spring and another flange having stoppers formed in a diametrical line on the circumference thereof to be faced to each other, on each of the upper surface of which a fixing pin is mounted; a load control including a torsion bar inserted into said cavity, on both ends of which a coupling portion is formed, a disk having guiders bent downward to be respectively positioned adjacent said stoppers contacting with said flange on said opened end of said winding portion and a projector formed on the upper surface thereof and a sprocket portion having a boss projected therefrom and coupled with one end of said torsion bar, a groove formed on the circumference thereof adjacent said boss to guide the movement of said projector, a sprocket stretched from a flange to be engaged with a tooth portion of said right leg portion and having another shaft projected from the center thereof; and said web sensor including a retainer mounted adjacent said sprocket portion to couple a guide of said locking portion with a hook ring thereof, around the inner circumference of which a second sprocket is formed, a clutch wheel including an opening portion at the center, a first tooth portion formed on the inner circumference of said opening and a second tooth portion formed around the outer circumference thereof to be concentric with said first tooth portion and a mass member coupled with said clutch wheel and having a wing integrally extended in an arc around the circumference thereof and a latch member connected at one end to an inertia spring to be elastically supported, on one end of each of which latch is formed to be passed over the tops of the teeth of a first tooth portion of the clutch wheel.

BRIEF DESCRIPTION OF THE DRAWINGS

The present invention now will be described in detail with reference to the accompanying drawings, in which.

DETAILED DESCRIPTION OF THE INVENTION

Figure 1:
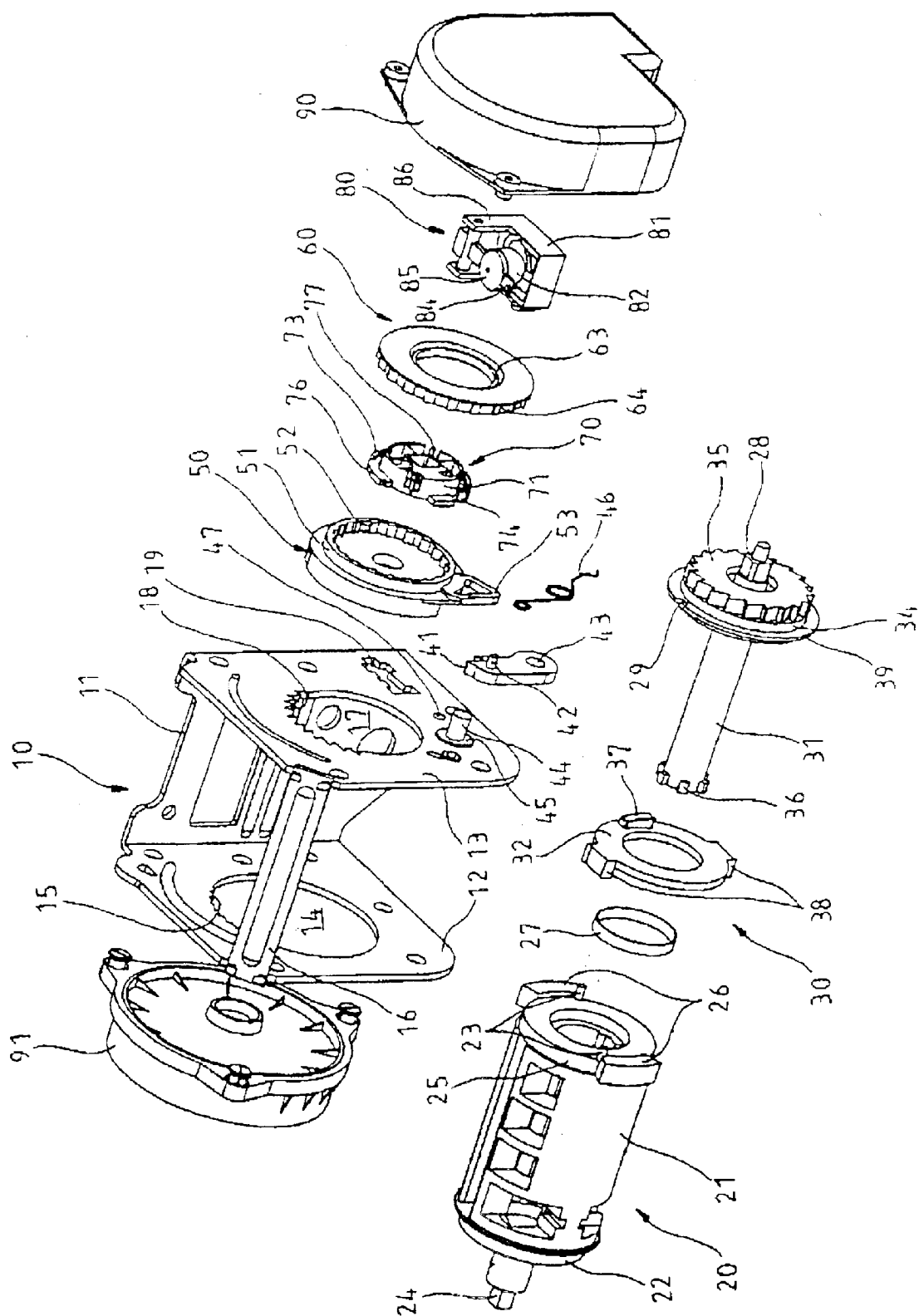
FIG. 1 is an exploded perspective view illustrating a vehicular seatbelt retractor according to the present invention.

Referring to FIG. 1, a frame 10, having a fundamentally channel-shaped configuration, includes a rear wall 11 to be fixed to a vehicle's chassis and a pair of left and right leg portions 12 and 13 integrally extended toward the front surface from both ends of the rear wall. The left leg portion 12 includes an opening 14 formed at the center and a frictional tooth portion 15 formed in a predetermined arc at the upper portion of the opening 14. The right leg portion 13 includes an opening 17 with a frictional tooth portion 18 being formed in a predetermined arc at its upper portion, corresponding to the configuration of the left leg portion 12 The right leg portion 13 further includes a mounting hole 19 formed at its lower portion to position a vehicle motion sensor. Also, a fixing bar 16 is mounted between the leg portions 12 and 13 to fix their interval. A case 91 is mounted on the left leg portion 12 with a spring (not shown), which is coupled with a shaft 24 of a spool 20 to wind a web thereon.

A spool 20 is configured to be coupled with a load control 30, which comprises a winding portion 21 for winding the web and including a cavity, in which a receptacle groove is formed to receive one end of a torsion bar 31, a center shaft 24 integrally projected from the one side surface thereof and, left flanges 22 integrally formed on one side thereof to be positioned and rotated facing the openings 14 and stoppers 23 projected integrally on a diametrical line from the circumference of the other flange 25 thereof. On the stoppers 23, fixing pins 26 are respectively mounted at a diametrical line to each other to be positioned in a supporting groove 29.

A load control 30 includes a torsion bar 31 fitted into the winding portion 21 to be rotated with the shaft 24, a frictional disk 32 configured to control the torque of the torsion bar 31, a sprocket portion 35 having a boss 33 with at least one guide groove formed at its lower surface to determine the torsion degree of the torsion bar 31, to which the other end of the torsion bar 31 is coupled, and a sprocket portion 35 stretched from a flange 34 positioned to be flush with the circumferential surface of the opening 17 in the leg portion 13. The sprocket portion 35 includes a shaft 28 projected from the center thereof and an extending portion 39 extended from the flange 34 with at least one supporting groove 29 formed around the circumference thereof.

The torsion bar 31 includes coupling portions 36 formed at both ends in the form of a tooth to be respectively coupled with another coupling portion in the cavity of the winding portion 21 and the boss 33, so that it forces the winding portion 21 to be rotated. The frictional disk 32 includes a projector 37 on its upper surface to be inserted into a guide groove 37' and guiders 38 bent downward from its circumference to be contacted with the flange 25 and positioned adjacent the stoppers 23. The bushing 27 is made of soft materials and fitted onto the outer circumferential portion of the boss 33 to reduce the friction force between the boss 33 and the inner portion of the flange 25.

Figure 3A:
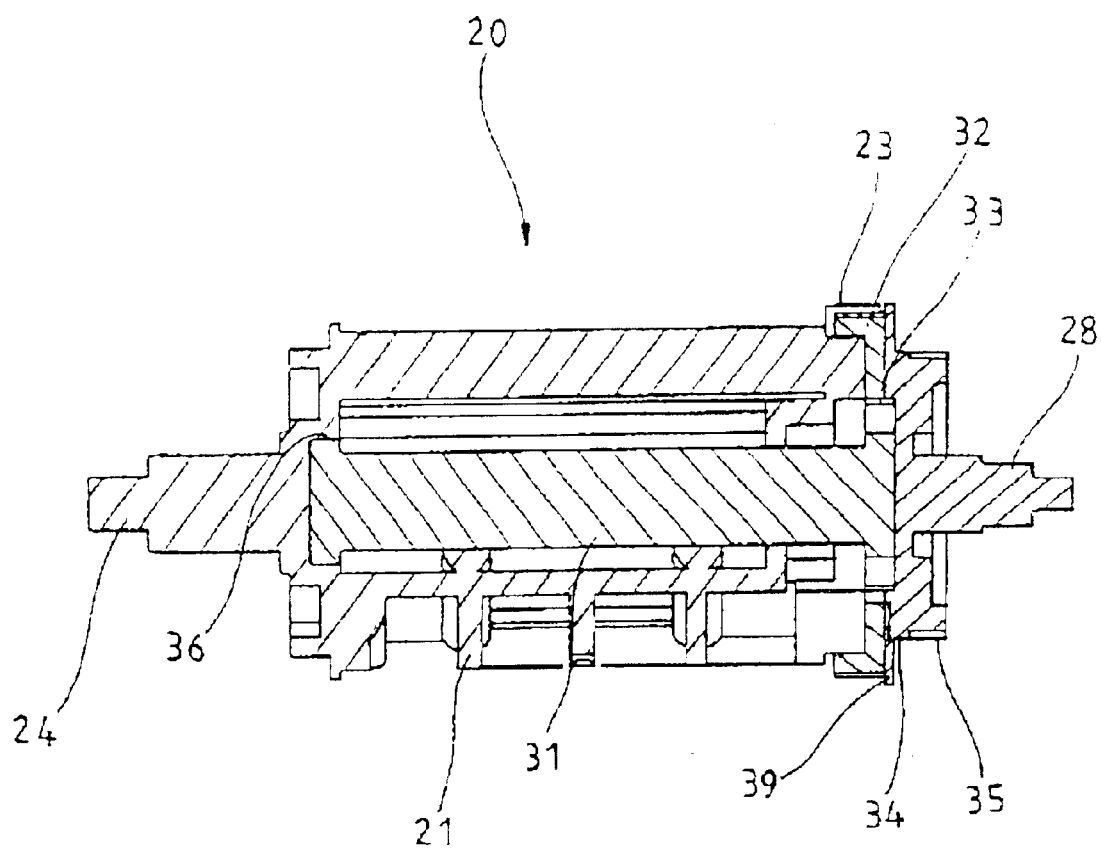
FIGS. 3A, 3B and 3C are views illustrating the assembly and the operation of a load control according to the present invention.
Figure 3B:
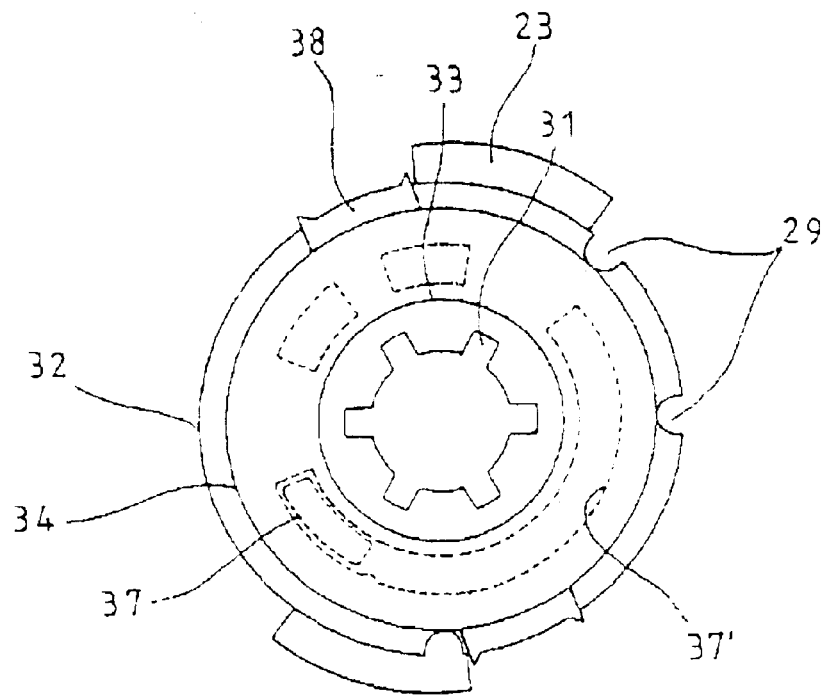
Figure 3C:
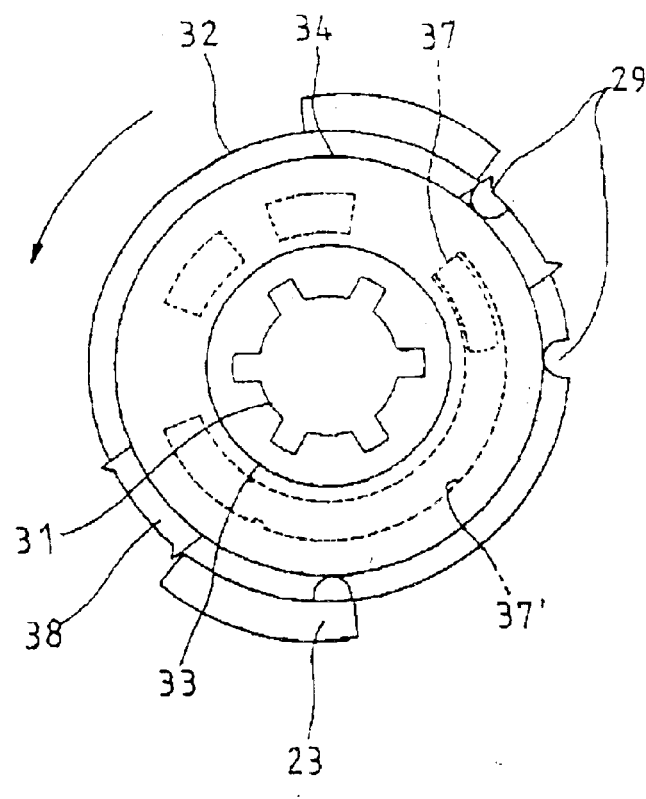

Therefore, as shown in FIGS. 3A, 3B and 3C, the torsion bar 32 is inserted into the cavity of the spool 20. The frictional disk 31 is mounted on the front surface of the flange 25 with the guiders 38 being respectively positioned adjacent to the stoppers 23. As the projector 37 is inserted into the guide groove 37' of the boss 33, a coupling portion of the boss 33 is coupled with the other end of the torsion bar 31. The load control 30 assembled as described above is subject to controlling the loading applied to the web upon the webbing acceleration.

When a seatbelt retractor provided with the load control 30 is mounted on a predetermined place in a vehicle, at an abnormal state that an excessive webbing acceleration or web withdrawal occurs, the sprocket portion 35 is suddenly locked in engagement with a locking portion 40 that is cooperated with a vehicle sensor or a web sensor. At that time, as the excessive load of a belted occupant pulls out the web still more in an unwinding direction, the winding portion 21 is forcedly not only rotated, but the disk 32 is also rotated by the friction force with the winding portion 21. The fixing pin 26 positioned in the supporting groove 29 is broken down, and then the projector 37 in the guide groove 37' is moved from the lower of FIG. 3B to the upper of FIG. 3C. At the same time, the guiders 38 each reaches the other surfaces of the stoppers 23 differently positioned in relation to each other matching up with the further rotation of the winding portion 21. Counteracting against the further web drawing-out force, the torsion bar 31 is twisted by an amount of its twisting property to reduce the web loading. Like this, during the rotating of the disk 32 and the twisting of the torsion bar 31, the sudden increased loading is absorbed and adjusted.

Figure 2:
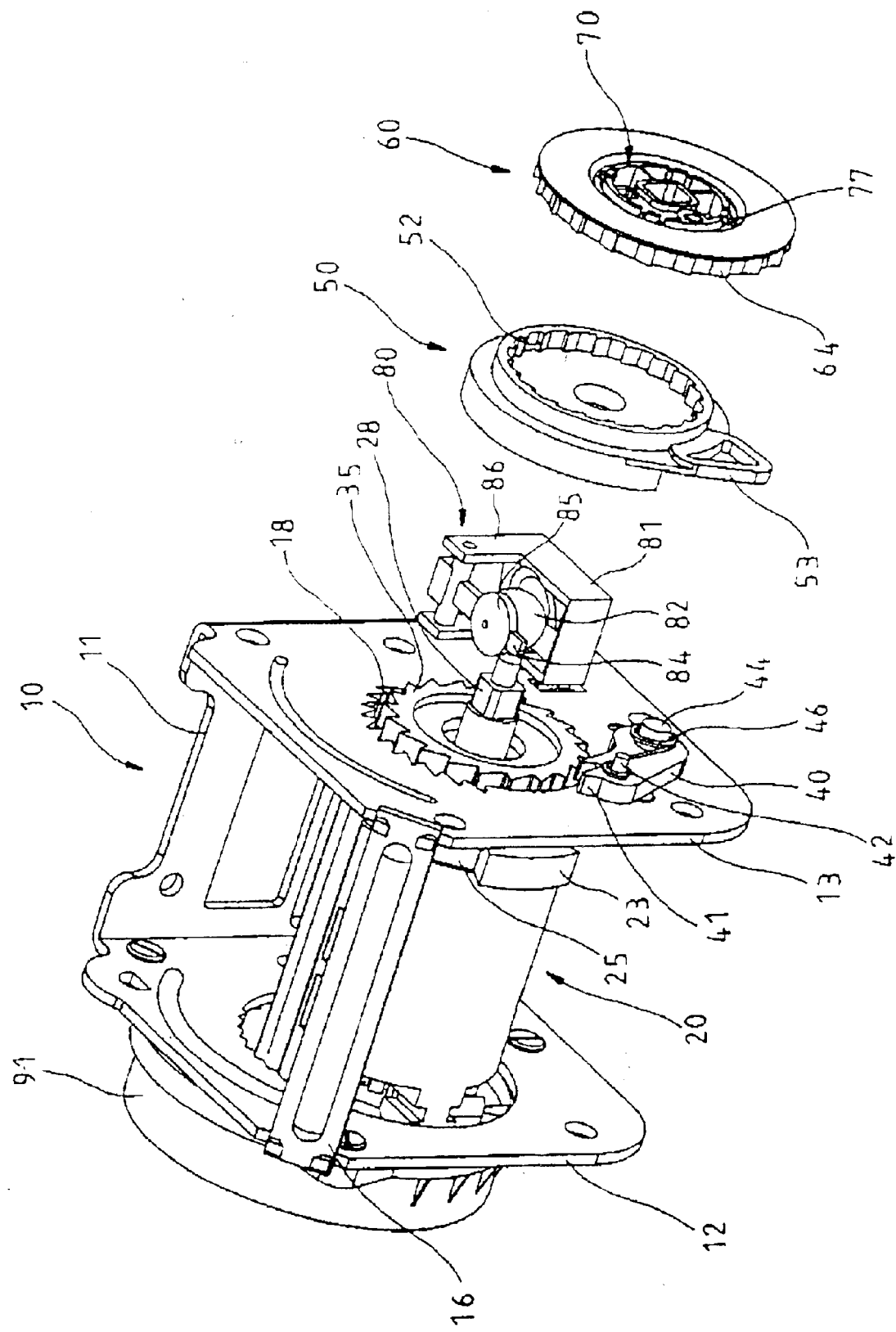
FIG. 2 is a partly exploded perspective view illustrating the assembling state of a load control, a locking portion, a retainer and a clutch wheel with respect to a spool according to the present invention.
Figure 4:
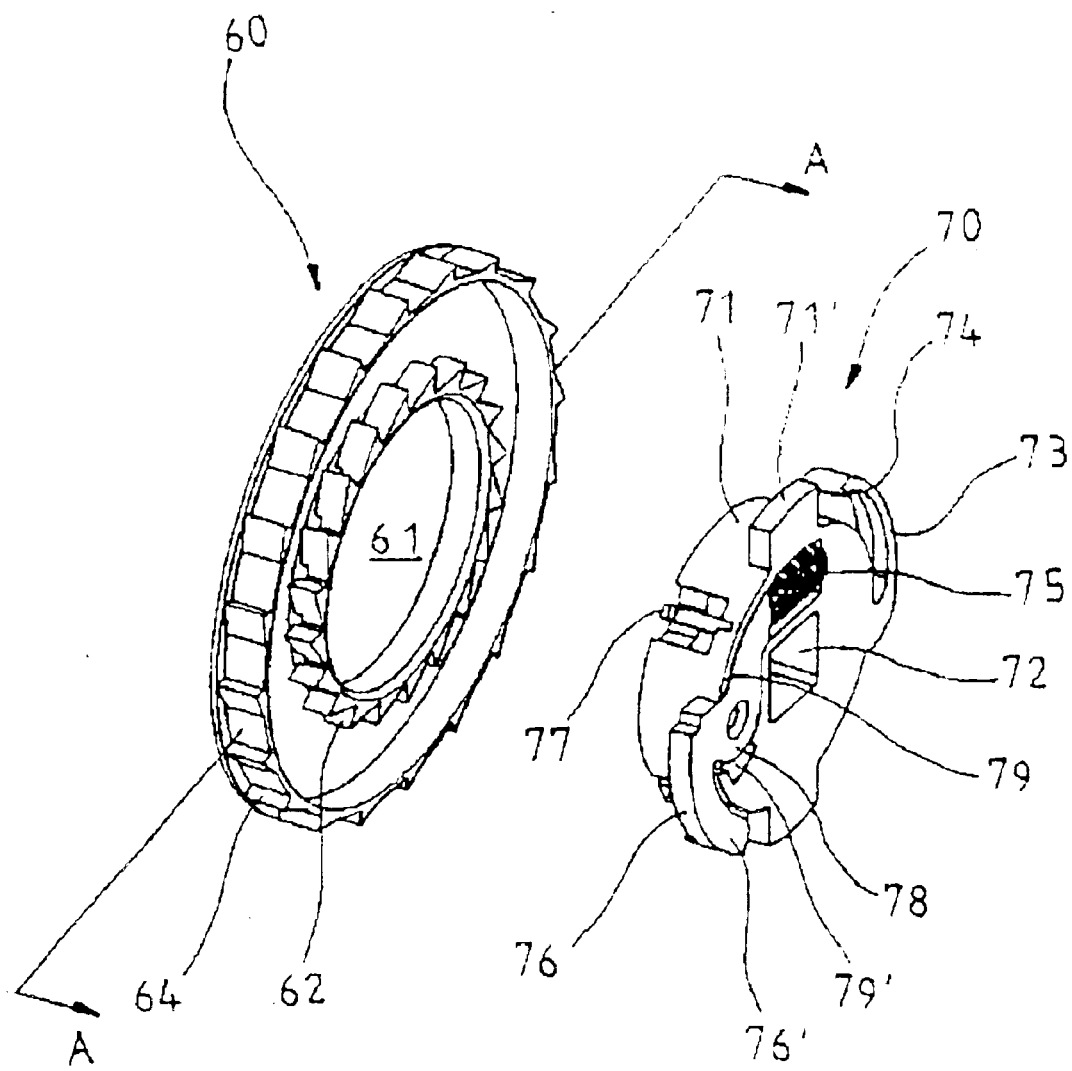
FIG. 4 is an exploded perspective view illustrating the separating state of a mass member and a clutch wheel constructed as a web sensor according to the present invention.
Figure 5:
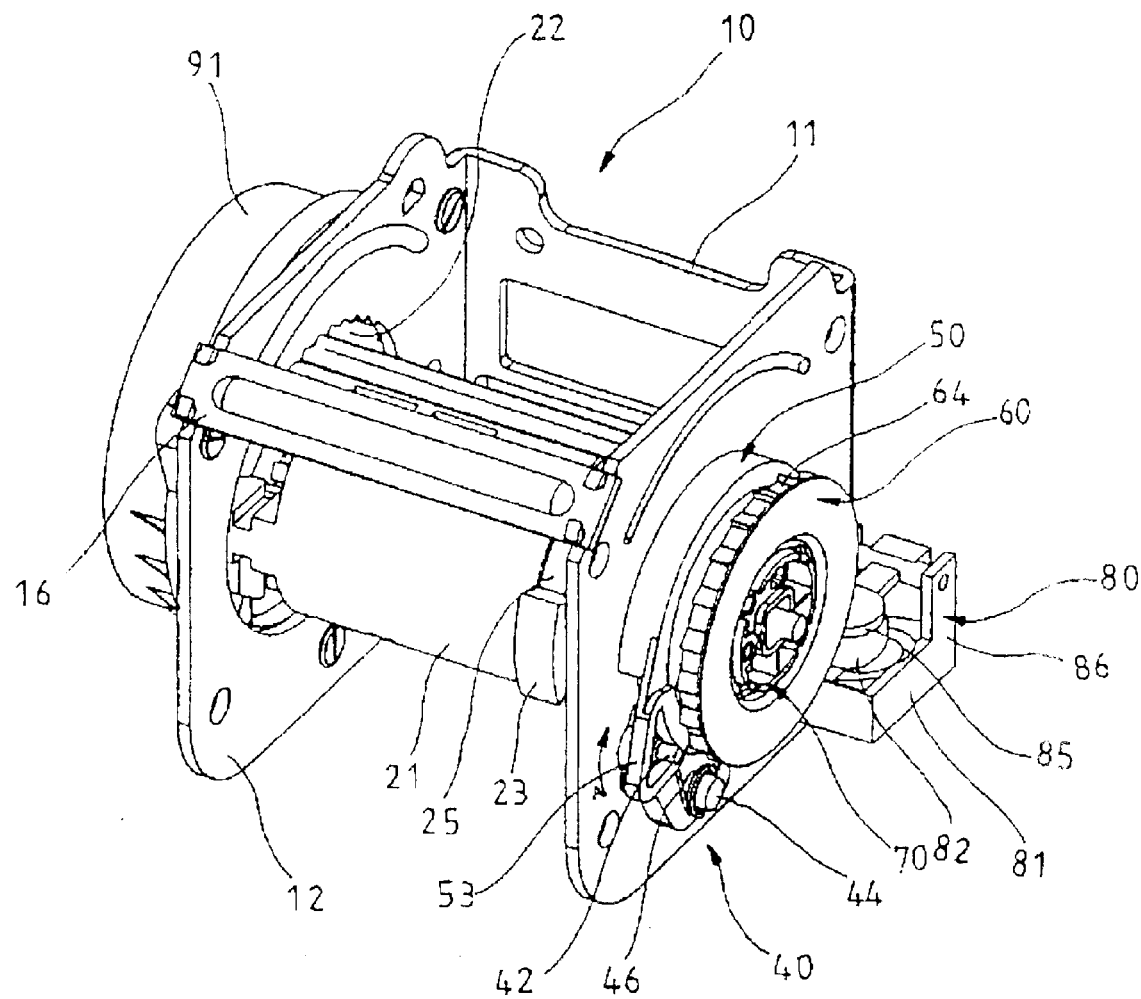
FIG. 5 is a perspective view illustrating the assembling state of a web sensor along with a vehicle sensor according to the present invention.

Referring to FIG. 1, FIG. 2, FIG. 4 and FIG. 5, again, a web sensor is subject to preventing the releasing of the webbing responding to the detection of the webbing acceleration and freely allowing the releasing of the webbing in a normal condition of a vehicle. The web sensor comprises a locking portion 40 positioned adjacent the lower portion of the sprocket portion 35 which is projected from the opening 17 of the right leg portion 13, a retainer 50 mounted adjacent the first sprocket portion 35 with the shaft 28 being passed through its center and for enabling the locking portion 40 to swing as a pendulum, and a clutch wheel 60 coupled with the retainer 50 to enable the retainer 50 to be rotated.

The locking portion 40 includes a latch 41 formed at the upper portion to engage with the first sprocket 35 by its pendulum movement, a guide pin 42 fixed to one surface thereof to guide its pendulum movement and a pinhole 43 formed at the lower portion to receive a fixing pin 44 thereby to enable the locking portion 40 to be pivoted. The fixing pin 44 is inserted into the pinhole 43 and fixed to the inner surface of the right leg portion 13. Therefore, the locking portion 40 is positioned adjacent the opening 17 of the right leg portion 13 by the fixing pin 44 and is biased in the opposite direction of the first sprocket 35 by means of a spring 46, the end of which is connected to the guide pin 42 and the other end of which is inserted into and fixed to a hole 47 formed on the predetermined position of the right leg portion 13.

A retainer 50 includes a retainer ring 51 formed around the inner circumference on one side surface thereof. A second sprocket 52 is formed in a tooth shape, having a top of a predetermined height, on the inner wall of the retainer ring 51. Also, a hook ring 53 is formed in a triangle shape at a predetermined position around the circumference of the retainer 50, to enable the pendulum movement of the locking portion 40. When the retainer 50 is assembled as shown in FIG. 2, the hook ring 53 receives the guide pin 42 to be positioned at its apex. Therefore, as the retainer 50 is moved in the direction of an arrow F, the guide pin 42 moves the locking portion 40 in the direction of an arrow B to engage the latch 41 with the first sprocket 35.

A clutch wheel 60 comprises an opening portion 61 formed at the center. The opening portion 61 includes a first tooth portion 62 having a predetermined width on the inner circumference thereof and a coupling surface 63 formed around the outer circumference to be coupled with the hooks 77. Also, the clutch wheel 60 includes a second tooth portion 64 formed around the outer circumference thereof to be concentric with the first tooth portion 62.

A mass member 70 is combined with the clutch wheel 60 in the opening portion 61. The mass member 70 includes a circular body 71 integrated with a rectangular shaft support 72, to which the rotational force of the spool shaft 28 is transferred. The circular body 71 is provided with wing 73 extended from one portion along the semi-circular arc of the circumference thereof and a latch member 76 pivoted on a pin 78 at the center thereof with its one end being inserted into an inertial spring 75 to be elastically supported thereon. The circular body 71 further includes a groove 79 formed in its back portion to receive the latch member 76 and the inertia spring 75 and a hook 79' mounted in the groove 79 adjacent the circumference of the body 71 to prevent the escaping thereof. The wing 73 and the latch members 76 have latches 74 and 76' formed at each other end thereof. Also, the circular body 71 includes a plurality of hooks 77 projected from the front surface of the circumference to be hung on the coupling surface 63. Each of extensions 71' is formed on the diametric line between the hooks 77 adjacent the wing 73 and the latch member 76 to support the circular body 71 in the opening portion 61 along with hooks 77 facing against the rear surface of the clutch wheel 60.

Figure 6A:
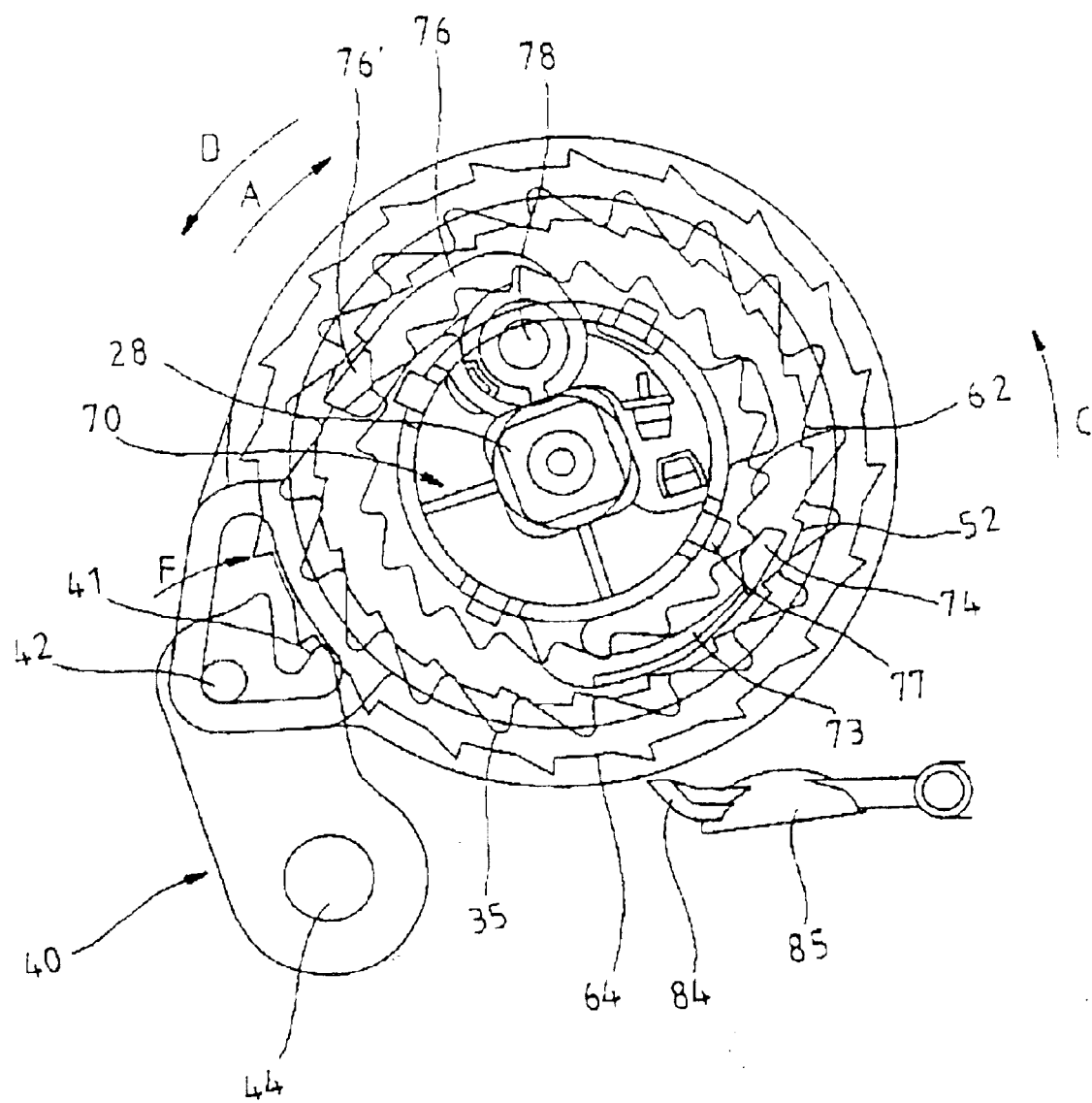
FIGS. 6A and 6B are cross-sectional views illustrating the operating relationship of a web sensor and a vehicle sensor cutting along line A—A of FIG. 4 according to the present invention.
Figure 6B:
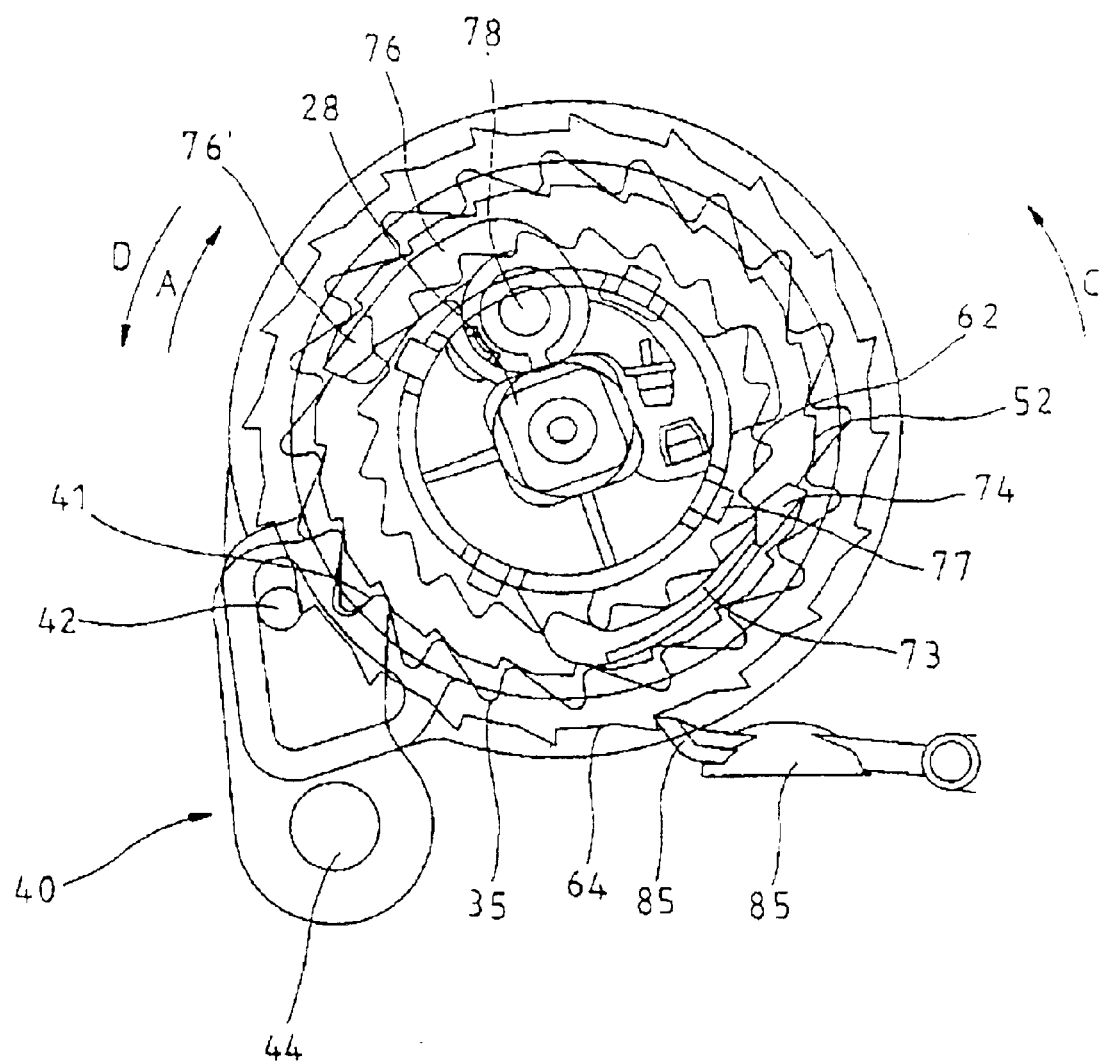

Upon the assembly of the mass member 70 with the clutch wheel 60, except for the wing 73 and the latch member 76, the mass member 70 is inserted onto the opening portion 61 formed by a body of the first tooth portion 62 to place the latches 74 and 76' on the first tooth portion 62 and to slidably couple the hooks 77 with the coupling surface 63. The web sensor is fitted onto the shaft 28 passing through the rectangular shaft supporter 72, when the system is assembled in a manner that the spool 20 is mounted on the frame 10 through the openings 14 and 17 with its shaft 24 being coupled to one end of the spring of the spring portion 91, the locking portion 40 is assembled on the right leg portion 13 and the retainer 50 is fitted onto the shaft 28 adjacent the sprocket portion 35 to position the guide pin 42 at the apex of the hook ring 53. At this time, the retainer ring 51 receives the mass member 70 to permit the latches 74 and 76' to be placed adjacent the second sprocket 52, the assembling configuration of which is shown in FIGS. 6A and 6B.

Therefore, the web sensor detects the acceleration of the webbing. As shown in FIG. 6A, a normal state is one in which the mass member 70 and the clutch wheel 60 are simultaneously rotated in the unwinding (releasing) direction C or the winding direction D with the latches 74 and 76' being contacted with the first tooth portion 62. However, at time of the webbing acceleration the mass member 70 is instantly rotated in the webbing releasing direction C, while its inertia force also rotates the clutch wheel 60. The latches 74 and 76' pass over the tops of the teeth of the first tooth portion 62, so its ends are hung on the second sprocket 52 of the retainer ring 51 due to their centrifugal force. At that time, the rotational force of the shaft 26 rotates the retainer 50 in the direction of arrow F, as shown in FIG. 6B. At the same time, the hook ring 53 of the retainer 50 forces the latch 41 of the locking portion 40 to be engaged with the sprocket portion 35 so as to stop the further rotation of the spool 20 and prevent the releasing of the webbing.

Furthermore, the excessive releasing force of the web forcedly rotates the winding portion 21 in an unwinding direction with the sprocket portion 35 being stopped. A friction between the frictional disk 32 and one surface of the winding portion 21 occurs to rotate the frictional disk 32, so that each of the guiders 38 reaches the other surface of the stoppers 23. And then, the torsion bar 31 is twisted to the level of its property to absorb/adjust the sudden increased loading applied to the web together with the frictional disk 32. Thereafter, the additional releasing force of the webbing pulls the rotating stopped spool 20 in a webbing direction, the frictional tooth portions 15 and 18 respectively formed on the opening portions 14 and 17 become engaged with the flanges 22 and 25 to assure the prevention of the further rotation of the spool 20. Herein, it is noted that the load control 30 is smoothly cooperated with the web sensor, and the inertia spring 75 can adjust a time that the latch 76' is latched on the second sprocket 52 in order to control the sensing speed of the webbing.

Besides, the invention adapts to a conventional vehicle sensor 80. As shown in FIGS. 1 and 2, the vehicle sensor 80 is mounted in the inner portion of a cover 90 and positioned in the mounting hole 19 of the frame 10 after the web sensor is assembled on the shaft 28 of the spool 20. The vehicle sensor 80 comprises a housing 81, on the rear portion of which two supporting portions 86 are integrally formed in a predetermined height in the form of a column, a ball 82 rolling-freely seated in a semi-sphered bottom of the housing 81 and a pawl lever 85 having a pawl 84 positioned on the upper of the ball 82, which is mounted to be pivoted between the supporting portions 86.

If the vehicle is under the abnormal states to be rapidly accelerated or driven in an off-road situation, the ball 82 is slanted in any direction from the normal position due to the vehicle's counteraction. At that time, the pawl 84 is engaged with the second tooth portion 64 of the clutch wheel 60. At the same time, the webbing releasing occurs, while the shaft 28 rotates the mass member 70, and the clutch wheel 60 has a momentary inertia force by the rotating force of the shaft 28 to be rotated. Thereafter, the latches 74 and 76' pass over the teeth tops of the first tooth portion 62 to be engaged with the second sprocket 52 of the retainer ring 51 and then to rotate the retainer 50 in the unwinding direction C of the webbing. Then, the locking portion 40 is moved in the direction of arrow F, as shown in FIG. 6B. At the same time, the latch 41 is engaged with the sprocket portion 35 to stop the further rotation of the spool 20 and prevent the releasing of the webbing.

Simultaneously, the excessive releasing force of the web forcedly rotates the spool 20 in an unwinding direction under a state that the sprocket portion 35 is stopped. A frictional force with one surface of the winding portion 21 rotates the frictional disk 32 to dissipate the pulling force applied to the web, and the torsion bar 31 is twisted to reduce the pulling force applied to the web. Further, as the spool 20 itself is pulled up in a webbing direction, the flanges 22 and 34 are engaged with the frictional tooth portions 15 and 18 respectively formed on the opening portions 14 and 17 to assure the prevention of the further rotation of the spool 20. Herein, it is noted that the configuration can respond, immediately, to the occurrences of the vehicle's abrupt acceleration as well as the abnormal state such as a roll over in an off-road condition. Further, the vehicle sensor 80 is well cooperated with the web sensor and the load control 30 within the time range adjusted according to the present invention.

As described above, the present invention enables a web sensor to operate a retainer and a locking portion, quickly, in response to the webbing acceleration in the webbing sensing procedures, thereby stopping the rotation of a sprocket portion, a load control to control the loading applied to a web in order to stop the rotation of a spool. Similarly, when a vehicle sensor detects an abnormal state of a vehicle, the web sensor and its related peripheral devices are operated in the same manner as that at the time of the web sensing. Therefore, the present invention enhances the sensing speed of the webbing as well as provides immediate restraint to an occupant in the vehicle in response to the sensing operation.

Since the present invention may be embodied in various forms, without departing from the essential characteristics thereof, it should be understood that the above-described embodiment is not to be limited by any of the details of the foregoing description, unless otherwise specified, but should be construed only as defined in the appended claims.

What is claimed is:

1. A vehicular seatbelt retractor for winding and releasing a length of webbing from a spool, said vehicular seatbelt retractor comprising:

a frame including openings formed at a center of each of a pair of left and right leg portions, on an upper portion of each leg portion a frictional tooth portion is formed in a predetermined arc;

a spool including a winding portion sealed at one end and opened at the other end and a sprocket portion for winding a web thereon, in which the winding portion forming a cavity therein, the spool including a flange formed on a circumferential portion from one side of said spool to be positioned on an opening thickness of said left leg portion with a shaft projected from a center of said sealed end to be coupled with one end of a spring and another flange having stoppers formed in a diametrical line on a circumference thereof facing each other, on an upper surface of each stopper a fixing pin is mounted;

a load control including a torsion bar inserted into said cavity, on both ends of which a coupling portion is formed, a disk having guiders bent downward to be respectively positioned adjacent said stoppers contacting said flange on said opened end of said winding portion and a projector formed on an upper surface of the disk and a sprocket portion having a boss projected therefrom and coupled with one end of said torsion bar, a groove formed on a circumference of the sprocket portion adjacent said boss to guide the movement of said projector, a sprocket stretched from a flange to be engaged with a tooth portion of said right leg portion and having another shaft projected from a center of the sprocket;

a locking portion mounted adjacent said sprocket portion to stop rotation of said spool;

a web sensor including a retainer mounted adjacent said sprocket portion to couple a guide of said locking portion with a hook ring thereof, around an inner circumference of the retainer, a second sprocket is formed, a clutch wheel including an opening portion at a center, a first tooth portion formed on an inner circumference of said opening and a second tooth portion formed around an outer circumference thereof to be concentric with said first tooth portion and a mass member coupled with said clutch wheel and having a wing integrally extended in an arc around a circumference thereof and a latch member connected at one end to an inertia spring to be elastically supported, one end of the latch member being formed to be passed over tops of teeth of a first tooth portion of said clutch wheel; and a vehicle sensor mounted adjacent said clutch wheel to engage with a second tooth portion of said clutch wheel.

2. The vehicular seatbelt retractor for winding and releasing a length of webbing from a spool as claimed in claim 1, wherein said load control further comprises a bushing of a flexible material fitted onto an outer circumference of said boss to reduce the friction between said disk and said boss.

3. The vehicular seatbelt retractor for winding and releasing a length of webbing from a spool as claimed in claim 1, wherein said mass member comprises said wing and said latch member positioned on a diametrical line to be faced to each other, in which said wing is integrally extended in an arc shape around a circumference of the mass member with a latch formed on its end being formed as a free end and said latch member is pivoted at a center in a groove to receive it with one end being elastically supported by said inertia spring and a latch being formed as a free end.

* * * * *